July 2, 1963  J. J. RODDY  3,096,097
INDEXING CHUCK
Filed April 26, 1961  3 Sheets-Sheet 1

INVENTOR.
JOHN J. RODDY
BY
Lindsey Prutzman & Hayes
ATTORNEYS

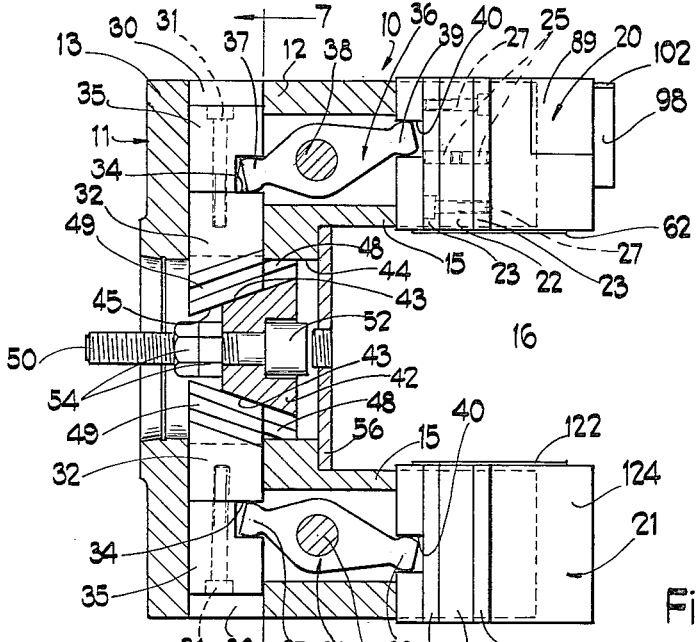
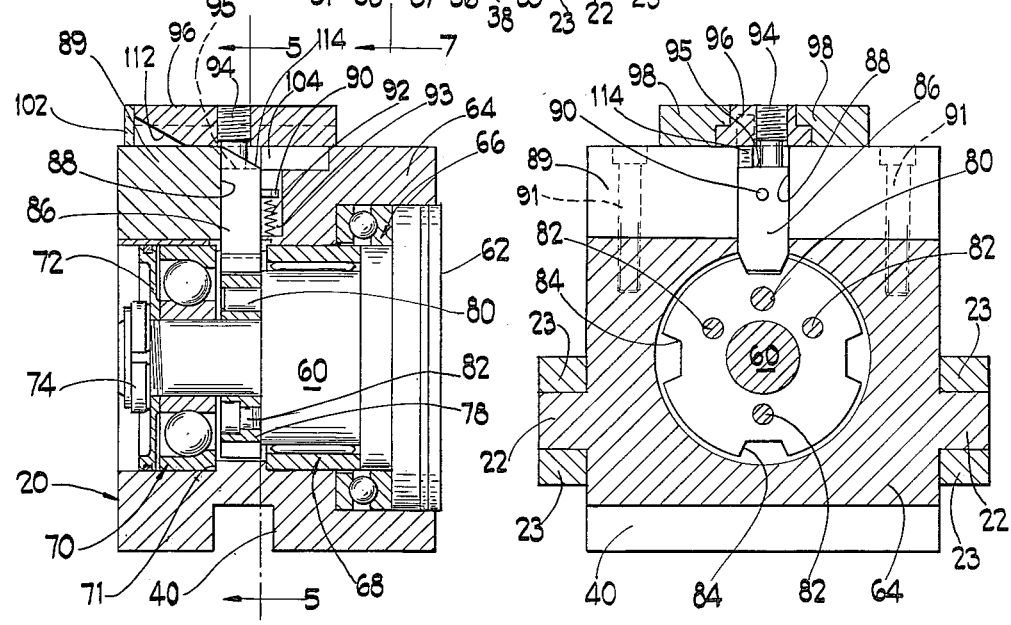

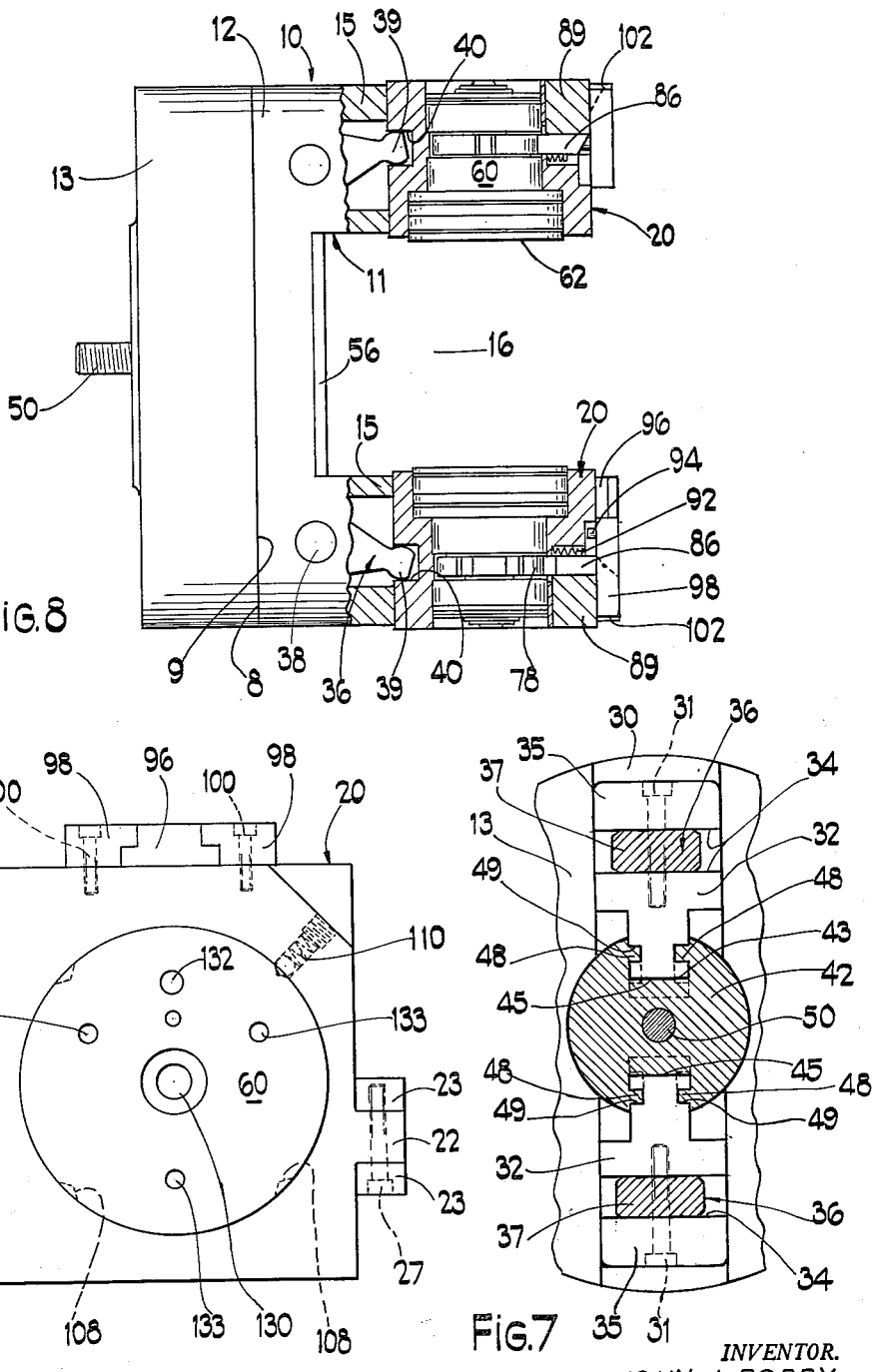

3,096,097
INDEXING CHUCK

John J. Roddy, Meriden, Conn., assignor to Skinner Precision Industries, Inc., New Britain, Conn., a corporation of Connecticut
Filed Apr. 26, 1961, Ser. No. 105,579
10 Claims. (Cl. 279—5)

The present invention relates generally to indexing chucks and more particularly to an indexing chuck of the type having opposed workpiece gripping jaws that can be indexed about their axes to a plurality of positions.

It is a general object of this invention to provide an improved indexing chuck in which the indexing mechanism is freely operable under full jaw pressure and without requiring contact with the workpiece supported therein and is easily and reliably operated for rigidly retaining a selected position.

It is another object of this invention to provide an indexing chuck in which the indexing mechanism can be readily disassembled for re-adapting the mechanism to a new indexing relationship to thereby provide maximum operational flexibility for the chuck.

It is a still further object of this invention to provide an improved indexing chuck in which the indexing mechanism indicates when the chuck jaws are improperly indexed, and which precludes locking the jaws in the improperly indexed position.

Another object of this invention is to provide an improved indexing chuck which has a simple arrangement of parts and which is constructed to reduce the effect of centrifugal force upon jaw force.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 3 is a section view taken substantially along the line 3—3 of FIG. 2;

FIG. 4 is an enlarged section view of an indexing jaw support taken substantially along the line 4—4 of FIG. 2;

FIG. 5 is a section view of the indexing jaw support of FIG. 4 taken along the line 5—5 of FIG. 4;

FIG. 6 is a right end view of the indexing jaw support of FIG. 4;

FIG. 7 is a fragmentary section view taken substantially along the line 7—7 of FIG. 3; and FIG. 8 is a side view partly broken away and partly in section of a modified indexing chuck.

Figure 1:
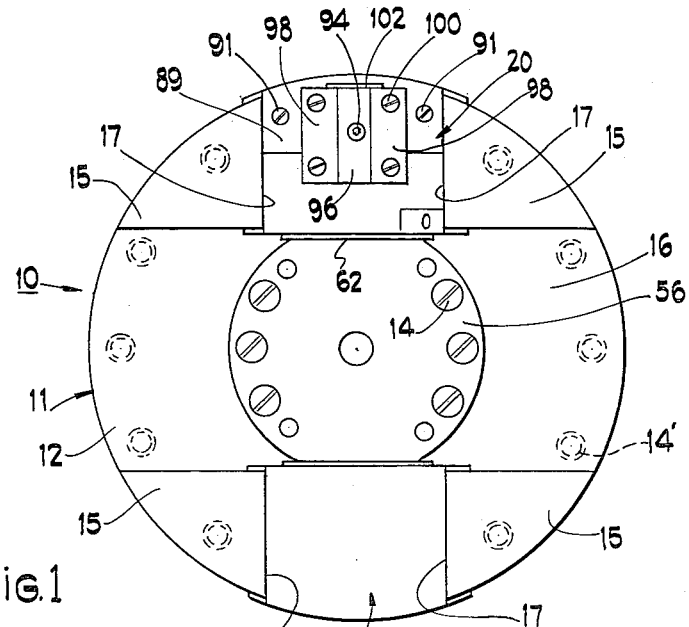
FIG. 1 is an end view of an embodiment of an indexing chuck of this invention.

Referring to the drawings, the indexing chuck generally characterized by the numeral 10 is shown to have a chuck body 11 with two annular concentric housing members 12 and 13 having contiguous faces 8 and 9, respectively, and which are removably secured by bolts 14′ for convenient separation and access to the parts carried within the body 11. The annular housing member 12 has a workpiece receiving opening 16 located between axially extending projections 15 that slidingly support on their opposed surfaces 17, the indexing and floating jaw supports 20 and 21. To locate and align these jaw supports, they are provided with extensions or rails 22 and replaceable wear plates 23 fixed thereto for sliding engagement with opposing slots 19 on the projections 15. The wear plates are retained on opposite sides of the rails 22 by locating pins 25 and screws 27.

Referring to FIGS. 3 and 7, the annular housing member 13 has diametrically opposed slots 30 extending from the housing member face 9 and in which are slideably supported a pair of master jaws or wedge assemblies comprising wedge members 32 and wedge extensions 35 secured thereto as by screws 31. Jaw support operating levers 36 are pivotally mounted in an opening in the housing member 12 upon pins 38 and have extensions 37, 39 engaging slots 34, 40 in the wedge extensions 35 and in the jaw supports 20 and 21, respectively, to translate the movement of the master jaws into movement of the jaw supports. To simplify the repair and replacement of the indexing jaw parts, the operating lever 36 and the indexing and floating jaw supports 20, 21 can be easily removed from the chuck body by first removing the wedge extension retaining screws 31 and the wedge extensions 35, and then removing the levers 36 through the space vacated by the wedge extensions. The indexing and floating jaw supports 20 and 21 are then free to be removed by sliding them outwardly from the opening 16.

Within the housing members 12 and 13 there is a central cylindrical opening 44 having a cover 56 secured to the member 12 by the bolts 14. The opening 44 slideably supports a generally cylindrical wedge actuator 42 which has diametrically opposed axially tapering grooves 43 engaging correspondingly tapered ends 45 on the wedge members 32. The actuator 42 additionally has axially tapering circumferential projections 48 (FIG. 7) extending into tapering slots 49 in the wedge members 32 to prevent play in the master jaws and to provide a large area for transmitting large jaw operating forces for obtaining maximum rigidity and a minimum of wear. A threaded draw bar 50 affixed to the actuator 42 by the draw bar head 52 and a pair of lock nuts 54 is operated in a well-known manner to move the wedge actuator 42 within the opening 44 to operate the master jaws and therefore operate the indexing and floating jaws 20, 21 and the workpiece engaging jaws (not shown) attached thereto.

Referring to the indexing jaw support 20, best shown in FIGS. 4, 5 and 6, an indexing spindle, generally designated by the numeral 60, having a jaw supporting surface 62 is rotatably supported within its housing 64 by a ball thrust bearing assembly 66, a needle bearing assembly 68, and a ball bearing assembly 70 capable of carrying radial loads and axial loads against the shoulder 71. The thrust bearing assembly 66 is located between radial shoulders on the spindle 60 and the jaw support housing 64 and has an inner diameter greater than the outer diameter of the bearing assembly 68. And the bearing assemblies 68 and 70 are located between cylindrical portions on the indexing spindle 60 and on the spindle housing 64 and provide a means for supporting radial loads on the spindle 60. A nut 74 threaded upon the end of the indexing spindle 60 is tightened against a bearing seal 72 and the inner race of the bearing assembly 70 for axially retaining the indexing spindle 60 within its housing 64 through the bearing assemblies 66 and 70.

Adjacent a radial face on the spindle 60 located between the bearing assemblies 68 and 70 is an indexing plate 78 accurately positioned and retained thereon by an aligning pin 80 and three angularly spaced screws 82. As the diameter of the indexing plate 78 is less than the overall diameter of the bearing assembly 68, and because of the assembled relationship of the bearing assemblies 66, 68, 70 in the housing 64, the indexing spindle 60, the bearing assembly 68 and the indexing plate 78 can be readily removed by removing the nut 74 and sliding these parts from the spindle housing 64. This ease of disassembly facilitates replacement of the indexing plate 78 or the indexing spindle 60 as dictated by changing indexing and chucking requirements.

Figure 2:
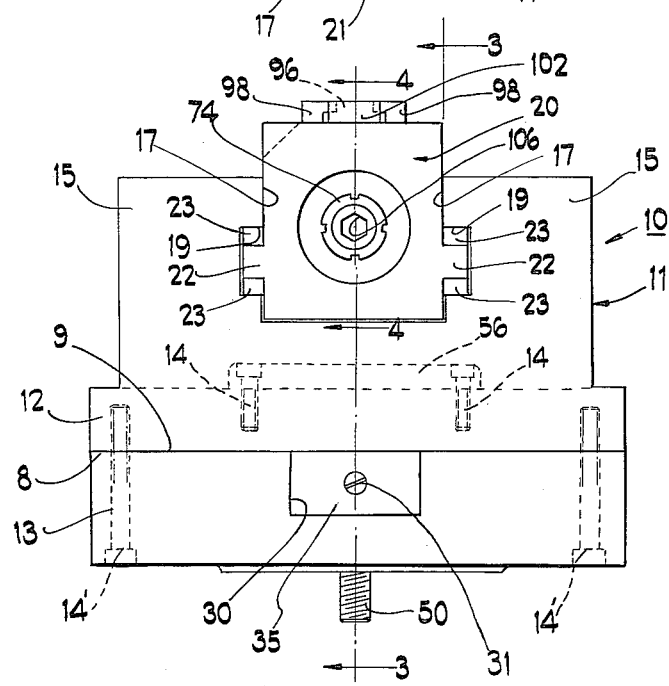
FIG. 2 is a top view of the indexing chuck of FIG. 1.

Circumferentially spaced about the indexing plate 78 are a plurality of notches 84 having inwardly tapering side walls and which are selectively engaged by a reciprocably mounted rectangular indexing or locking pin 86 having a tapered end that is adapted to cooperate with the notches 84 to prevent rotation of the indexing plate 78 and thereby lock the spindle 60 in the desired position. The indexing pin 86 is mounted within a slot 88 in an indexing pin carrier 89 affixed to the housing 64 as by screws 91 (FIGS. 1 and 5) and is biased radially outwardly by a spring 92 located in a housing recess 93 and abutting a pin 90 (FIG. 4) fixed to the indexing pin. The indexing pin 86 is securely retained in its inner locking position by a stop assembly comprising a set screw 94 adapted to engage the outer edge 95 of the indexing pin, and a slide 96 overlying the pin and carrying the set screw, and which is slideably supported between guides 98 that are secured to the housing 64 as by screws 100 (FIG. 6). A plate 102 is fixed to the guides 98 for excluding foreign matter, and an extension of the set screw 94 engages the carrier 89 to limit the retraction of the slide 96 and to align it with the indexing pin 86. By loosening the set screw 94 approximately one-half turn, its frictional engagement with the indexing pin 86 is released, and the slide 96 can then be manually extended with the set screw 94 moving within a recess 104 in the housing 64 until the indexing pin tapered edge 114 and the slide tapered edge 112 are in alignment. The indexing pin 86 is then biased away from the indexing plate by the spring 92 thereby freeing the indexing spindle 60 and allowing it to be manually indexed or rotated as with a suitable wrench inserted within a wrench socket 106 (FIG. 2) located in the end of the spindle 60. The indexing pin is, however, retained within its supporting slot 88 by the slide 96 and is removable only after the set screw 94 is threaded out of the recess 104 and the slide 96 is fully extended.

A plurality of recesses 108 (FIG. 6) spaced from the outer face 62 of the spindle 60 are positioned to receive a spring operated detent 110 when the tapered notches 84 in the indexing plate 78 are substantially aligned with the indexing pin 86. The detent 110, therefore, gives a "feel" to the operator when the indexing spindle is in each of the indexing positions. After indexing or rotating the plate 78, the locking pin 86 is cammed into engagement with a notch in the indexing plate 78 by returning the slide 96 to the retracted or locking position due to the camming engagement between the tapered edges 112 and 114. For securely retaining the indexing plate 78, it is then only necessary to tighten the set screw 94 approximately one-half turn. Since the slide 96 cannot be retracted if the indexing pin 86 is not properly aligned with one of the indexing notches 84, the retraction of the slide positively indicates that the pin 86 is located in one of the indexing plate notches. Additionally, the indexing pin 86 remains out of engagement with the indexing plate notches and cannot be urged into engagement therewith by the set screw 94 until the pin and slot are aligned.

This indexing assembly facilitates spindle indexing since the set screw need only be loosened a small amount, since the slide 96 can be quickly operated to and from the locking position, and since the spindle can be quickly and accurately indexed to the selected position. Additionally, the outward bias in the indexing pin 86 precludes shock loading on the indexing mechanism during the indexing operation, and the centrifugal force on the slide 96 created when the chuck is rotated assists in retaining the slide in the retracted position.

To support and accurately locate a workpiece engaging jaw on the indexing jaw support 20, a central aperture 130 (FIG. 6) and an outlying aperture 132 are located in the face 62 of the indexing spindle 60 to receive dowel pins extending from the workpiece jaw. The jaw is fixed to the spindle 60 by screws extending into threaded apertures 133 in the spindle face. A second workpiece engaging jaw is similarly fastened to a floating spindle 122, and the floating spindle is indexed along with the rotation of the indexing spindle when the workpiece engaging jaws and the workpiece are securely retained within the chuck. Preferably the floating spindle is supported within its housing 124 by means identical to that supporting the indexing spindle 60, i.e., bearing assemblies 66, 68, 70 previously described, to give it the same rigid bearing support.

As seen in FIG. 8, the floating jaw support 21 could be replaced by an indexing jaw support 20 having an indexing plate with indexing notches aligned to cooperate with the notches of the other indexing spindle, or misaligned to enable it to index the workpiece to positions not provided by the other indexing jaw support. In the latter arrangement, only one of the jaw supports 20 would be used in its indexing capacity at any particular time, and the other jaw support would act as a floating support with its indexing pin 86 either removed or disengaged from the indexing plate.

The floating jaw support 21 could be provided with a friction lock for locking the jaws and workpiece in any selected position as found desirable, thereby giving added flexibility to the indexing chuck. This friction lock could be conveniently made by using an indexing support housing 64, by replacing the indexing pin 86 with an adjustable friction lock and by replacing the indexing plate 78 with a cylindrical non-slotted friction plate.

The indexing chuck of this invention can, therefore, be easily and accurately operated without releasing the jaw pressure, and provides an indexing mechanism that gives a positive indication when the jaws are properly positioned. Further, the indexing chuck of this invention provides jaw supports either or both of which may be used as indexing jaws, which are of minimum size for reducing the centrifugal forces thereon and which, nevertheless, rigidly support the workpiece.

As will be apparent to persons skilled in the art, various modifications and adaptations of the structure above described will become readily apparent without departure from the spirit and scope of the invention, the scope of which is defined in the appended claims.

I claim:

1. An indexing chuck, comprising: a chuck housing, a pair of opposed workpiece jaw supports mounted upon the housing for movement toward and away from each other, an indexing spindle adapted for indexing a chuck supported workpiece, means rotatably mounting the spindle in one of the opposed jaw supports, an indexing plate on the indexing spindle having a plurality of indexing notches thereon angularly spaced about the axis of rotation of the spindle, a locking pin mounted for movement within said one jaw support and having one end thereon adapted to selectively engage the angularly spaced notches for preventing rotation of the spindle, and a locking pin stop mounted upon said one jaw support adjacent the other end of the locking pin for movement between a first position and a second position, said stop having means overlying the other end of the locking pin to positively lock the pin in engagement with the indexing plate when the slide is in the first position.

2. An indexing chuck, comprising; a chuck housing, a pair of opposed workpiece jaw supports mounted upon the housing for movement toward and away from each other, an indexing spindle adapted for indexing a chuck supported workpiece, bearing means rotatably mounting the spindle in one of the jaw supports, an indexing plate removably fixed to the indexing spindle and having a plurality of tapered indexing notches on the circumference thereof angularly spaced about the axis of rotation of the spindle, a locking pin supported for longitudinal movement on said one jaw support and having one end thereon tapered to selectively engage the angularly spaced notches for preventing rotation of the spindle, and a locking pin stop mounted upon said one jaw support for movement between a first position overlying the other end of the locking pin and preventing movement thereof and a second position freeing the pin for disengagement from the indexing plate.

3. The indexing chuck defined in claim 2 wherein the stop has a screw threaded thereon in alignment with the locking pin when the stop is in its said first position, said screw being adapted to force the pin into engagement with the indexing plate.

4. An indexing spindle assembly for use in an indexing chuck having a housing and opposed workpiece jaw supports adjustably mounted upon the housing for movement toward and away from each other, comprising; an indexing spindle being adapted for indexing a chuck supported workpiece, bearing means rotatably mounting the indexing spindle within the indexing chuck, said indexing spindle having a plurality of locking notches angularly spaced about its axis of rotation, a locking pin mounted within the indexing chuck for movement between a locking position and an unlocking position, the locking pin when in its locking positon having one end thereon selectively engaging the spindle notches for preventing rotation of the spindle, spring means biasing the pin toward the unlocking position, and a pin stop mounted for movement on the indexing chuck between a first position overlying the locking pin and a second position allowing the biasing means to move the pin to its unlocking position, said pin stop having means engaging the pin and moving it to its locking position against the spring bias when moving the stop to its first position.

5. An indexing spindle assembly for use in an indexing chuck having a housing and a pair of workpiece jaw supports adjustably mounted upon the housing for retaining a workpiece therebetween, comprising; an indexing spindle adapted for indexing a chuck supported workpiece, bearing means rotatably supporting the spindle within the indexing chuck, said spindle having a plurality of notches angularly spaced about its axis of rotation, a locking pin mounted on the indexing chuck for movement between a locking position and an unlocking position, said locking pin when in its locking position having one end thereon selectively engaging the angularly spaced notches for preventing rotation of the spindle, spring means biasing the locking pin toward its unlocking position, and a pin stop mounted for movement upon the indexing chuck between a position overlying the other end of the locking pin and a second position to positively lock the locking pin in engagement with one of said notches when in the overlying position, said pin stop having a tapered edge adapted to engage said other end of the locking pin for moving the locking pin into its locking position when the stop is moved to its overlying position, said pin stop including a screw having an end portion adapted to engage the other end of the locking pin when the stop is in its overlying position to secure the pin stop against movement, said indexing chuck having a recess therein adapted for receiving the extended end portion of the screw when the pin stop is moved to its second position.

6. An indexing chuck, comprising; a chuck housing, a pair of opposed workpiece jaw supports slideably mounted upon the housing, means adapted to adjustably move the jaw supports toward or away from each other, a pair of indexing spindles mounted in the opposed jaw supports for rotation about a common axis, an indexing plate removably fixed to each of the indexing spindles and having a plurality of spindle locking notches thereon angularly spaced about the spindle axis, the locking notches on one of the indexing plates having a different angular spacing from the notches on the other indexing plate, indexing plate locking pins mounted for movement in the jaw supports and having one end thereon adapted to selectively engage the indexing plate notches for preventing rotation of the indexing spindles, and a locking pin stop on each of the jaw supports having means operable to positively lock the locking pins in engagement with the indexing plates.

7. An indexing chuck, comprising; a chuck housing, a pair of opposed workpiece jaw supports slideably mounted on the housing, means adapted to adjustably move the jaw supports toward or away from each other, an indexing spindle being adapted to index a chuck supported workpiece, bearing means rotatably supporting the spindle in one of the opposed jaw supports, said bearing means comprising a thrust bearing assembly and a second bearing assembly spaced therefrom, said thrust bearing assembly being positioned between radial shoulders on said one jaw support and on the indexing spindle and being adapted to carry the loads on the spindle in one axial direction, said second bearing assembly being mounted between cylindrical portions on the indexing spindle and on said one jaw support and being adapted to carry radial loads on the spindle, and a spindle indexing mechanism comprising an indexing plate removably fixed to the indexing spindle.

8. An indexing chuck, comprising; a chuck housing, a pair of opposed workpiece jaw supports slideably mounted on the housing, means adapted to adjustably move the jaw supports toward or away from each other, an indexing spindle being adapted to index a chuck supported workpiece, bearing means rotatably supporting the spindle in one of the opposed jaw supports, said bearing means comprising a thrust bearing assembly and a second bearing assembly spaced therefrom, the indexing spindle and said one jaw support having opposed radial shoulders with the thrust bearing positioned therebetween for carrying loads on the spindle in one axial direction, the indexing spindle and said one jaw support having cylindrical portions with the second bearing assembly positioned therebetween for carrying radial loads on the spindle, said second bearing assembly engaging a shoulder on said one jaw support and being adapted to carry loads on the spindle in the other axial direction, a spindle indexing mechanism comprising an indexing plate removably fixed to the spindle intermediate the thrust and second bearing assemblies and having an outer diameter less than the inner diameter of the thrust bearing assembly, and means removably securing the spindle in place whereby upon release of said spindle securing means the spindle is axially removable from the jaw support to expose the indexing plate for replacement.

9. An indexing chuck, comprising; two housing members having a common center line and contiguous plane surfaces lying perpendicular thereto, fastening means removably retaining the housing members, one of the housing members having a central opening therein and radially extending diametrically opposed slots recessed from said plane surface thereon, wedge members slideably mounted in each of the slots and having an axially tapering wedge surface on the inner radial end thereof, a wedge actuator mounted within said central opening for reciprocable movement therein and having opposed axially tapering wedging grooves cooperating with the axially tapering wedge surfaces for moving the wedge members radially outwardly, the other housing member having opposed workpiece jaw supports slideably mounted thereon for linear movement toward and away from each other, pivotally mounted lever means operably connecting the wedge members and the jaw supports, at least one of said wedge members having extensions and providing therewith a recess to receive an end of the associated lever means, said extension being removable to provide access to said lever means whereby the lever means may be moved axially toward the wedge members to release the associated jaw support for removal from said other housing member.

10. An indexing chuck, comprising; a chuck housing with a central axis and having a central workpiece receiving opening therein, said housing defining a pair of diametrically opposed open-ended slots extending from the central opening, a pair of workpiece jaw supports mounted within the opposed slots, said jaw supports each having a pair of extensions with extension wear plates fixed thereto received within the housing slots and slideably supporting the jaw supports for movement toward and away from the central opening, an indexing spindle being adapted to index a chuck supported workpiece, bearing means rotatably supporting the spindle in one of the jaw supports, an indexing plate removably fixed to the indexing spindle and having a plurality of spindle locking notches thereon angularly spaced about the spindle axis, a locking pin mounted for movement on said one jaw support and having one end thereon adapted to selectively engage the indexing plate notches for preventing rotation of the spindle, a locking pin stop on the jaw support having means operable to overlie the other end of the locking pin to positively lock it in engagement with the indexing plate, and means adapted to adjustably move the jaw supports toward or away from each other.

References Cited in the file of this patent
UNITED STATES PATENTS

| | | |
|---|---|---|
| 983,918 | McClellan | Feb. 14, 1911 |
| 2,450,931 | Bault | Oct. 12, 1948 |
| 2,732,216 | Sloan | Jan. 24, 1956 |
| 2,972,487 | Blackburn | Feb. 21, 1961 |